F. G. PARKER.
LUGGAGE CARRIER.
APPLICATION FILED JUNE 9, 1913.

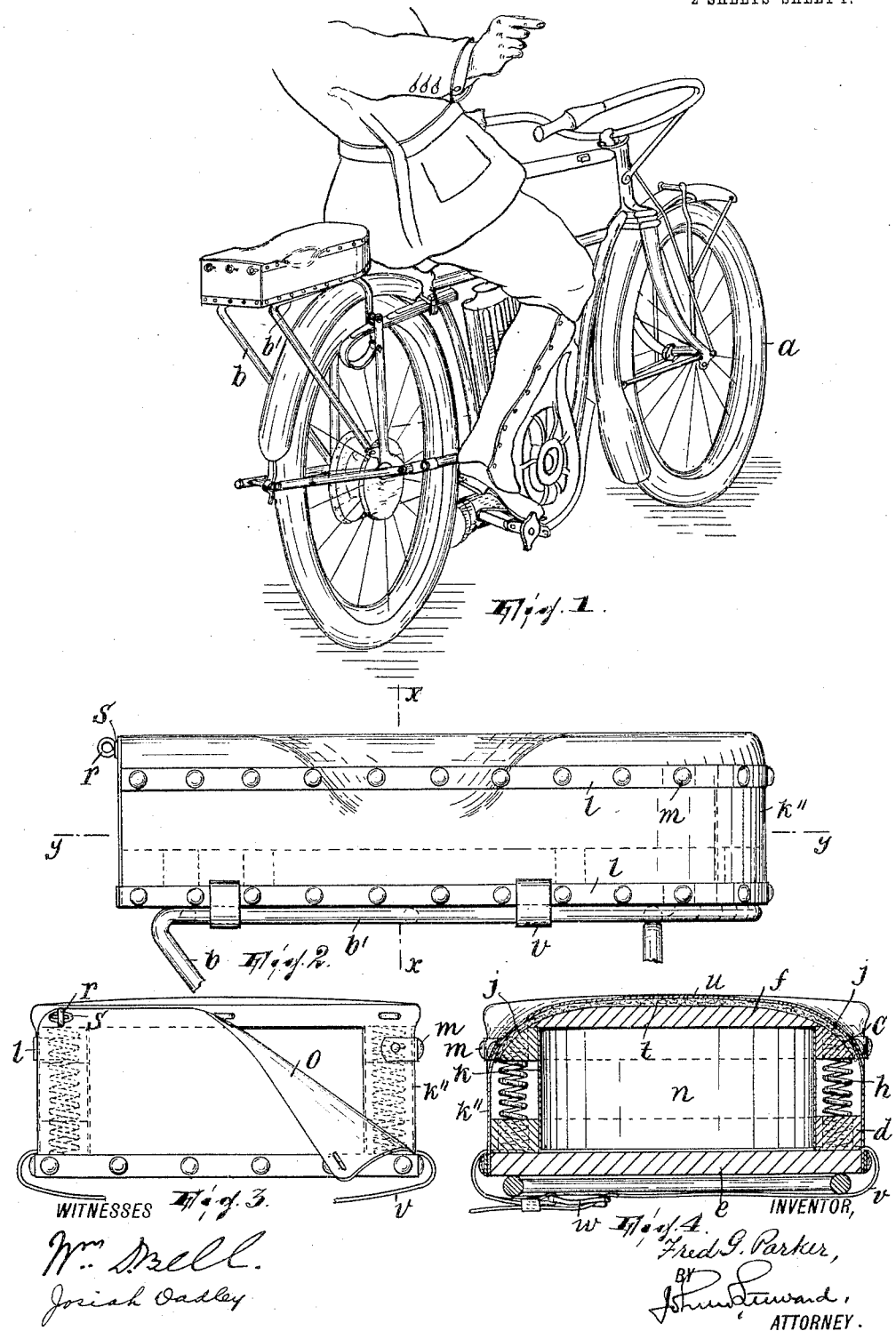

1,081,326.

Patented Dec. 16, 1913.
2 SHEETS—SHEET 2.

WITNESSES
Wm. Bell
Josiah Oadley

INVENTOR,
Fred G. Parker,
BY
John Steward.
ATTORNEY.

UNITED STATES PATENT OFFICE.

FRED G. PARKER, OF PATERSON, NEW JERSEY, ASSIGNOR OF ONE-HALF TO HENRY SMITH, OF ACQUACKANONK, NEW JERSEY.

LUGGAGE-CARRIER.

1,081,326.   Specification of Letters Patent.   Patented Dec. 16, 1913.

Application filed June 9, 1913. Serial No. 772,504.

*To all whom it may concern:*

Be it known that I, FRED G. PARKER, a citizen of the United States, residing at Paterson, in the county of Passaic and State of New Jersey, have invented certain new and useful Improvements in Luggage-Carriers, of which the following is a specification.

This invention relates to attachments for cycles and the like, and particularly to parcel carriers for motor cycles.

The object of the invention is to provide a simple, substantial and durable luggage carrier for cycles of the motor cycle type adapted to be used as an auxiliary seat, being supported on a suitable frame frequently provided on such vehicles for carrying luggage and the like.

Figure 5:
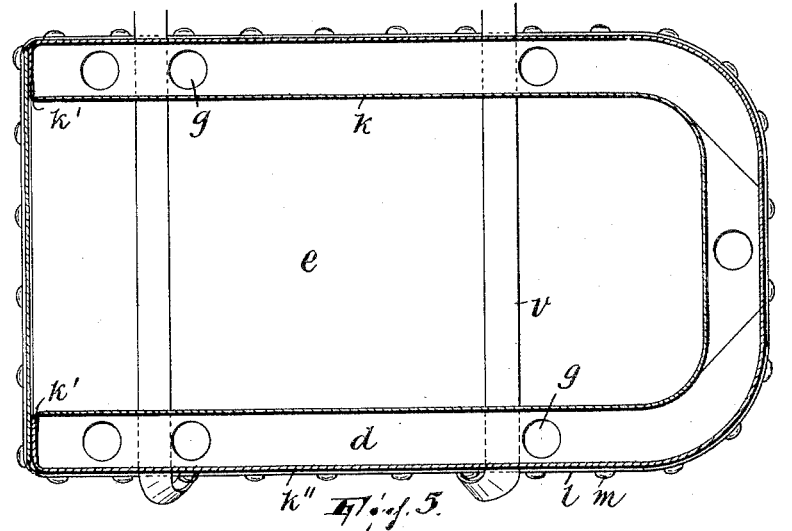
Figure 6:
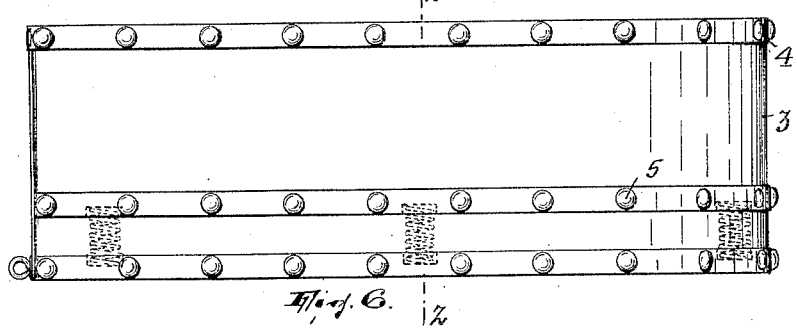
Figure 7:
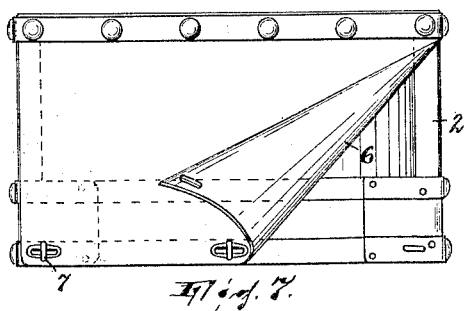
Figure 8:
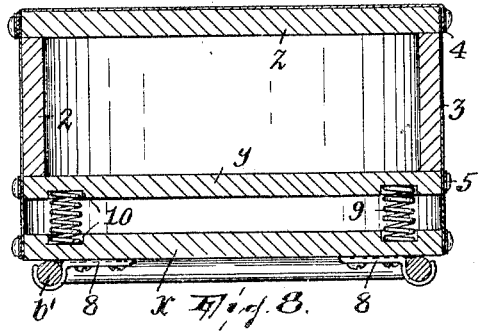

In the accompanying drawings, Figure 1 is a perspective view of a motor cycle having my improved luggage or parcel carrier attached thereto; Fig. 2 is a side elevation of one form of the improved carrier; Fig. 3 is a rear elevation thereof; Fig. 4 is a transverse sectional view thereof, on line $x$—$x$ of Fig. 2; Fig. 5 is a horizontal sectional view on line $y$—$y$ of Fig. 2; Fig. 6 is a side elevation of another form of the improved carrier; Fig. 7 is a rear elevation of the carrier shown in Fig. 6; and, Fig. 8 is a vertical sectional view on line $z$—$z$ in Fig. 6.

The cycle $a$ has back of the rider's seat any suitable frame, as $b$, for supporting luggage or the like and consisting of two suitably bent rods having horizontal supporting portions $b'$ and secured at their ends to the frame of the cycle, as shown in Fig. 1. On this frame $a$ the improved luggage carrier is secured, as seen in said figure.

Referring, first, to Figs. 2 to 5, $c$ and $d$ are two substantially U-shaped members arranged one above the other with their extremities projecting in the same direction. The member $d$ is suitably secured upon a plate $e$, while, superimposed upon the member $c$, is suitably secured a plate $f$. The plates $e$ and $f$ preferably have the same contour in plan as the members $c$ and $d$. Said members and plates may all be formed of wood.

The parts $d$ and $e$ go to form the base of the structure and the parts $c$ and $f$ its seat-forming portion.

At suitable points, as best shown in Fig. 5, vertical holes are bored in each of the base and seat-forming members. These, designated $g$, are arranged opposite each other and receive spiral springs $h$, which, because they snugly fit the holes and the holes have suitable depth, serve to confine the seat-forming member against undue displacement laterally. These springs give the structure yielding character, making it suitable for a seat and preserving the occupant of such seat against undue jar.

If desired, the material of the structure in the parts $c$ and $f$ may be rounded off, as indicated at $j$ in Fig. 4, so as not to cause discomfort to the rider.

Stretched between the members $c$ and $d$ and suitably secured thereto, extending from one free end of each to the other, is a lining $k$ of some suitable sheet material, such as duck, leather or the like. Extending, exteriorly of the structure, clear around the same from one edge $k'$ of the lining $k$ to the other is a flexible covering of suitable material, such as duck, leather or the like, $k''$. These may be suitably bound with tape $l$, secured in place by upholstering tacks $m$, as shown, giving a finish to the carrier. Thus is formed within the carrier a space $n$, open at one end of the carrier, serving as a receptacle for luggage and the like. The open end of the carrier may be closed by the flap $o$ which is preferably secured to the base member of the structure by the tape and tacks and may be held in the closed position by the thumb-screws $r$ passed through grommets $s$.

The seat-forming member may be padded or upholstered, as shown at $t$ in Fig. 4, and have a cover $u$ of sheet material, such as duck or leather.

This form of the luggage carrier may be strapped to the frame $b$, as by the straps $v$, which preferably are passed between the parts $c$ and $d$ and have buckles $w$ for securing together their ends.

Since the parts $c$ and $d$ afford means to limit the collapse of the structure under sudden pressure the receiving space $n$ always exists.

In the construction shown in Figs. 6 to 8 the lower or base member is a plate $x$ and the upper member a box-like structure comprising a bottom and top walls $y$ and $z$ and a U-shaped wall 2 which forms the sides and front of such structure, leaving the back thereof open. Except for the opening at the back of the box-like structure the whole may be covered with flexible sheet material 3 bound with tape 4 held in place by tacks 5. The said opening has a covering flap 6 secured in place by the tape and tacks and kept closed by suitable fastenings 7. 8 designates suitable clips, secured to the bottom member $x$, for attaching the carrier to the frame $b$ (see Fig. 8). The upper member is supported on the lower member through the medium of spiral springs 9 set in opposed holes 10 in said members. Although this form of the carrier is more particularly adapted as a receptacle for luggage, in which case the springs 9 preserve the contents from undue jar, it still may be used as an auxiliary seat for the cycle, the same as the construction shown in Figs. 1 to 5.

Having thus fully described my invention, what I claim as new and desire to secure by Letters Patent is:—

1. A hollow, receptacle-forming luggage carrier for a cycle including, in combination, a lower member, an upper member arranged in spaced relation to the lower member, and a system of springs arranged between said members and affording cushion-support for the upper member, the receptacle-portion of said structure being substantially U-shaped in plan and open at one end and having removable means to cover the open end thereof, substantially as described.

2. A hollow, receptacle-forming luggage-carrier for a cycle including, in combination, a lower member, an upper member arranged in spaced relation to the lower member, a system of springs arranged between said members and affording cushion-support for the upper member, flexible sheet material stretched between said members and extending the major part of the way around the receptacle portion of the carrier, whereby to leave an opening at one side of said receptacle portion, and a removable cover for said opening, substantially as described.

3. A combined luggage receptacle and auxiliary seat for cycles including, in combination, a base member, a seat member arranged above and spaced from the base member, a system of springs arranged between opposite marginal portions of said members and affording cushion-support for the seat member on the base member, flexible sheet material stretched between said members and extending partway around the same, whereby to leave an opening between said members at one side, and a removable cover for said opening, substantially as described.

4. In combination, upper and lower plate-like members, other upper and lower members each U-shaped in plan and respectively secured to the under and upper sides of the plate-like members, springs interposed between said U-shaped members, a flexible piece of sheet material extending partway around the several members, leaving an opening at the open ends of the U-shaped members and a removable cover for said opening, substantially as described.

5. A seat structure including, in combination, a lower member, an upper member arranged in spaced relation to the lower member, a system of springs arranged between said members and affording cushion-support for the upper member, inclosing means extending the major part of the way around the space between said members and forming between them a receptacle, said means affording a relatively limited opening leading to said receptacle, and a removable cover for said opening, substantially as described.

In testimony whereof I affix my signature in presence of two witnesses.

FRED G. PARKER.

Witnesses:
JOHN W. STEWARD,
WM. D. BELL.

Copies of this patent may be obtained for five cents each, by addressing the "Commissioner of Patents, Washington, D. C."